June 28, 1938.  M. B. LINTON  2,121,972

PORTABLE GREASE GUN

Filed June 9, 1932  8 Sheets-Sheet 1

MERWYN B. LINTON
INVENTOR

BY George R. Ericson
ATTORNEY

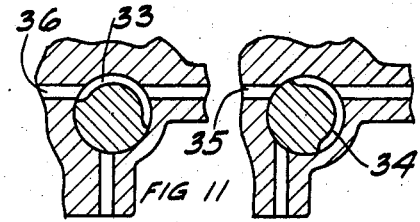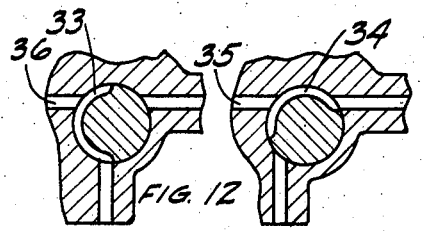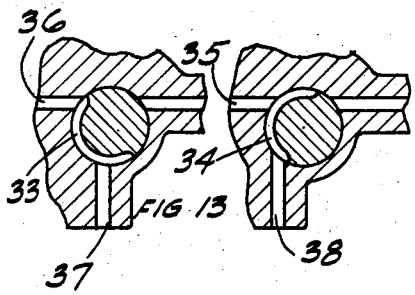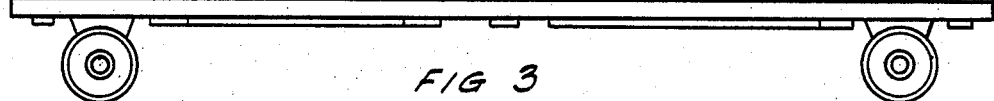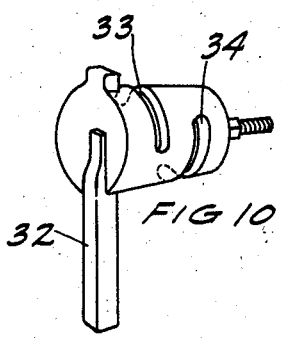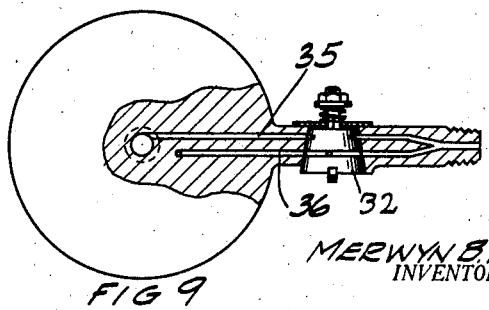

June 28, 1938.　　M. B. LINTON　　2,121,972
PORTABLE GREASE GUN
Filed June 9, 1932　　8 Sheets-Sheet 3
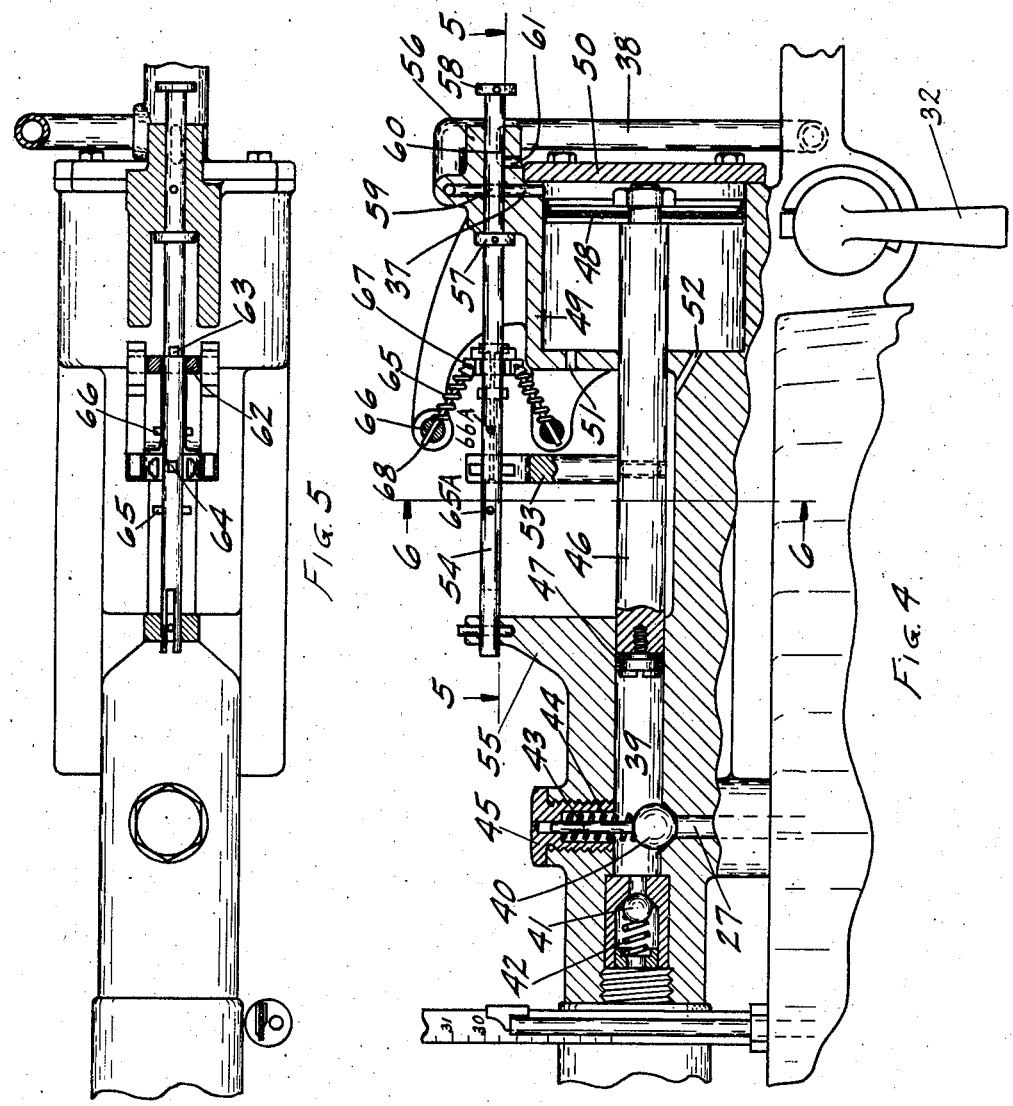
MERWYN B. LINTON
INVENTOR
BY Jerry R. Ericson
ATTORNEY

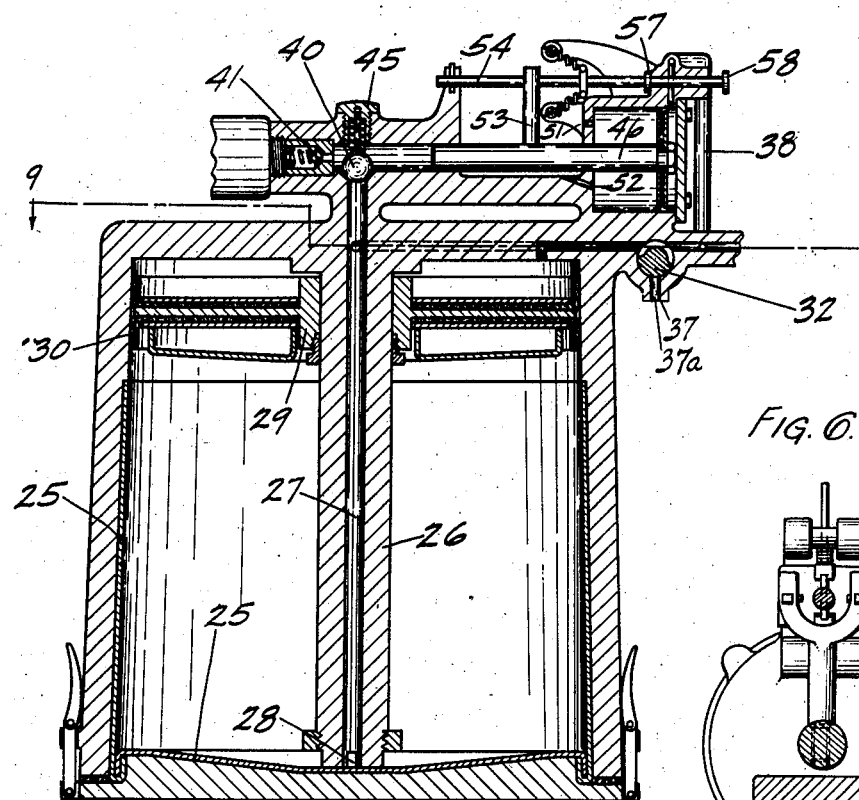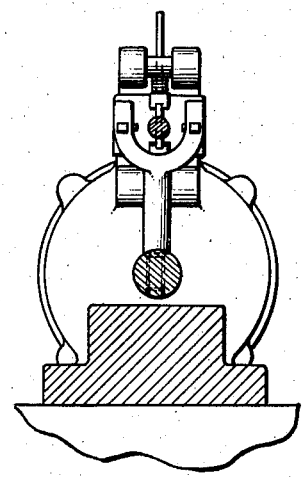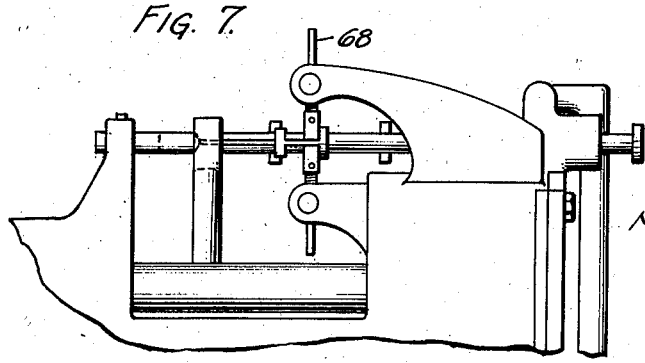

June 28, 1938.   M. B. LINTON   2,121,972
PORTABLE GREASE GUN
Filed June 9, 1932   8 Sheets-Sheet 5

MERWYN B. LINTON
INVENTOR

BY George R. Ericson
ATTORNEY

June 28, 1938.  M. B. LINTON  2,121,972
PORTABLE GREASE GUN
Filed June 9, 1932   8 Sheets-Sheet 8

MERWYN B. LINTON
INVENTOR

BY
ATTORNEY

Patented June 28, 1938

2,121,972

UNITED STATES PATENT OFFICE 2,121,972

PORTABLE GREASE GUN

Merwyn B. Linton, Tyler, Tex., assignor to The Lubrication Corporation, Chicago, Ill., a corporation of Delaware Application June 9, 1932, Serial No. 616,173

35 Claims. (Cl. 221—47.1)

This invention relates to portable grease guns and booster pumps therefor, and particularly to the comparatively large types of grease gun which are used in service stations and garages. In this type of device, it is desirable to provide a grease gun capable of containing a large quantity of lubricant so that the gun will not have to be recharged except at comparatively long intervals. Previous guns of this type have had to be recharged by hand which made this operation difficult and disagreeable as well as inefficient because of the liability of getting dirt and air into the container which would seriously interfere with the efficient operation of the device.

It is an object of this invention to provide a grease gun of this type which can be readily recharged without any danger of introducing dirt or air into the lubricant.

It is a further object of this invention to provide a grease gun of the above described type capable of being recharged without the necessity of the operator directly handling the grease itself.

It is a further object of this invention to provide a device of the above character which will be capable of supplying the grease at an extremely high pressure without necessity of making the grease container itself out of material capable of withstanding such pressure.

It is a further object of this invention to provide a safety latching device to prevent accidental opening of the grease container while there is pressure within.

It is a further object of this invention to provide a generally improved device of the character described.

The invention will be better understood upon reference to the accompanying drawings, in which:

Figure 3 is a side elevation showing the same device as shown in Figure 2, but with the parts in a different position.

Figure 4 shows the booster pump which forms a part of the device shown in Figures 1 to 3, parts being in section for better illustration thereof.

Figure 5 is a sectional plan view taken along the line 5—5 of Figure 4.

Figure 6 is a sectional side view taken along the line 6—6 of Figure 4.

Figure 7 is a side elevation of the parts shown in Figure 4.

Figure 8 is a sectional elevation showing the internal construction of my improved grease gun.

Figure 9 is a plan view taken along the lines 9—9 of Figure 8.

Figure 10 is a detail view showing the control valve.

Figures 11, 12, and 13 are diagrammatic sectional views showing the operating positions of the valve shown in Figure 10.

Figure 14:
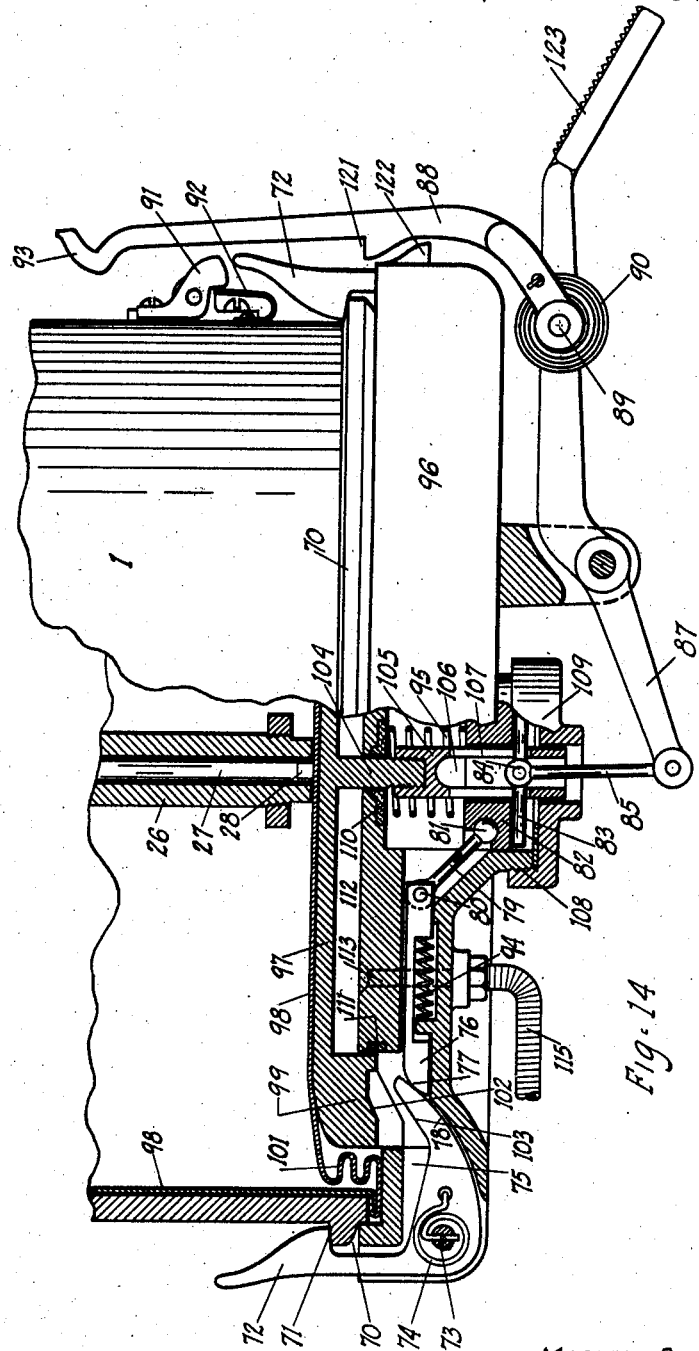

Figure 14 shows the construction of the base and lower part of the container and cartridge, also details of the safety latching device in a modified form of my invention.

Figure 15:
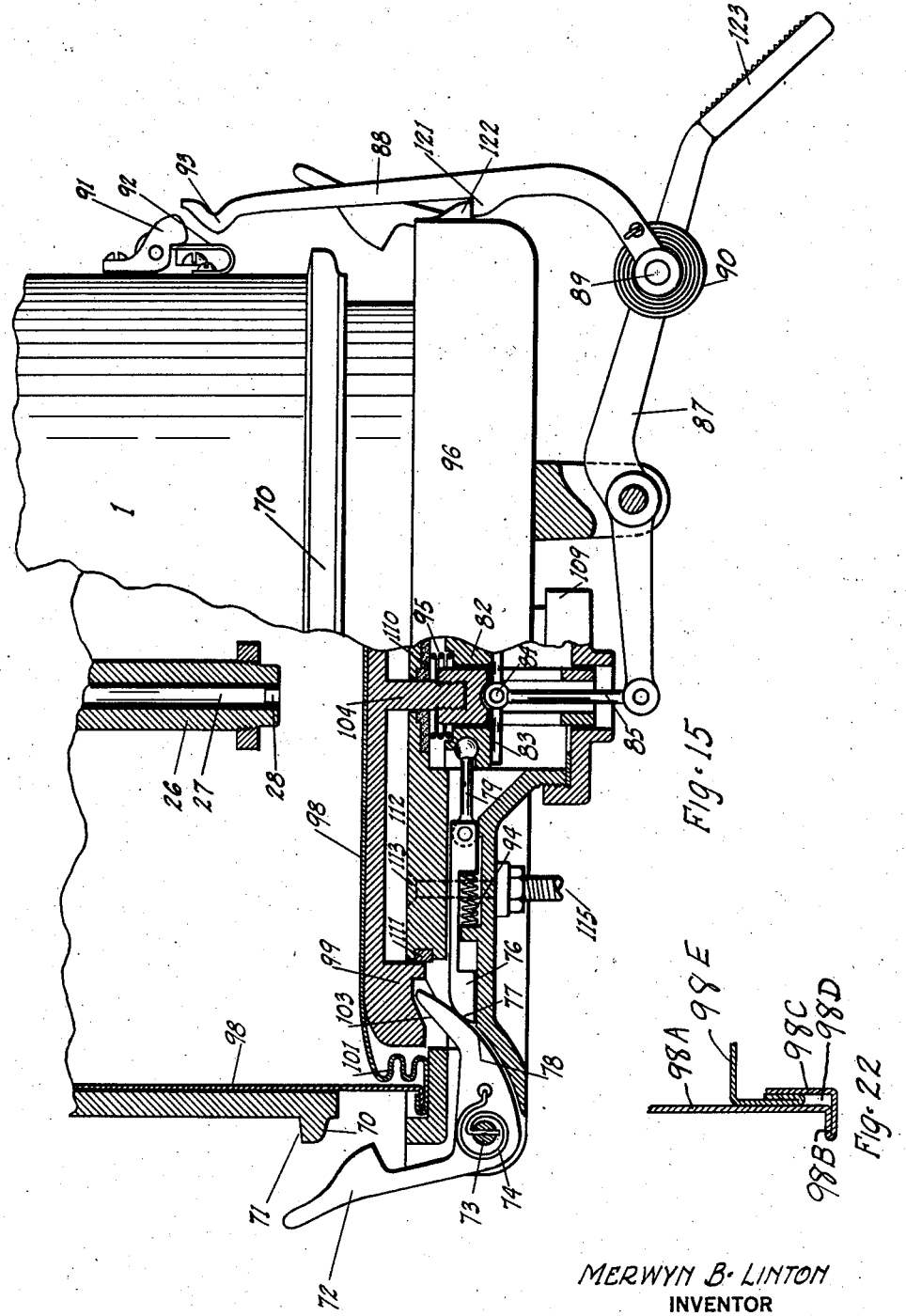

Figure 15 shows the same parts as Figure 14 with the latches in a released position, and the upper part of the container slightly raised from its base.

Figure 16:
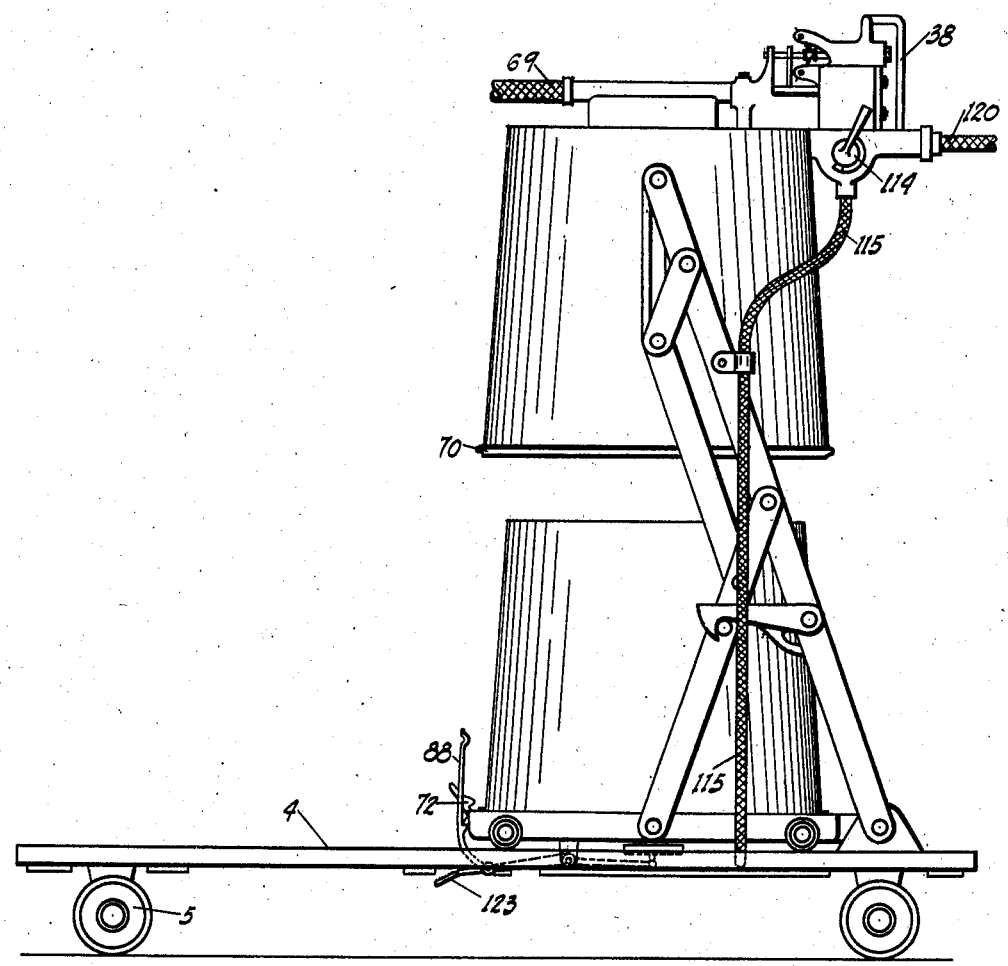

Figure 16 is a side elevation of this modification showing the gun in full open and elevated position.

Figure 17:
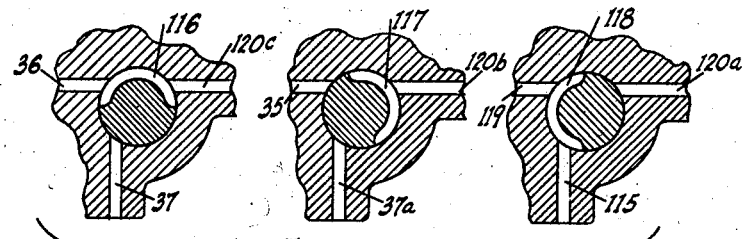
Figure 18:
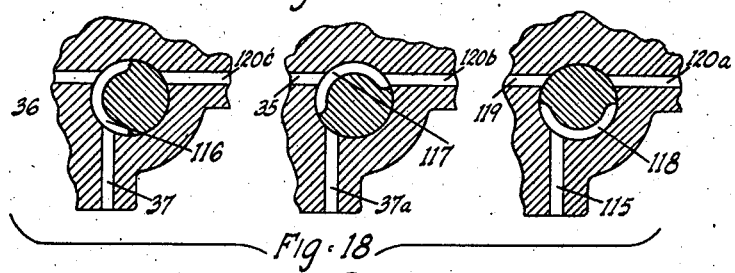
Figure 19:
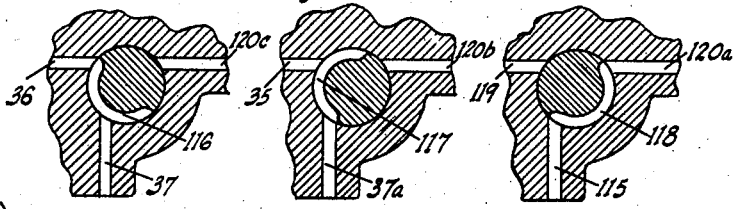

Figures 17, 18, and 19 are diagrammatic sectional views showing the three positions of the triple port control valve used in connection with the safety latching device.

Figures 20, 21:
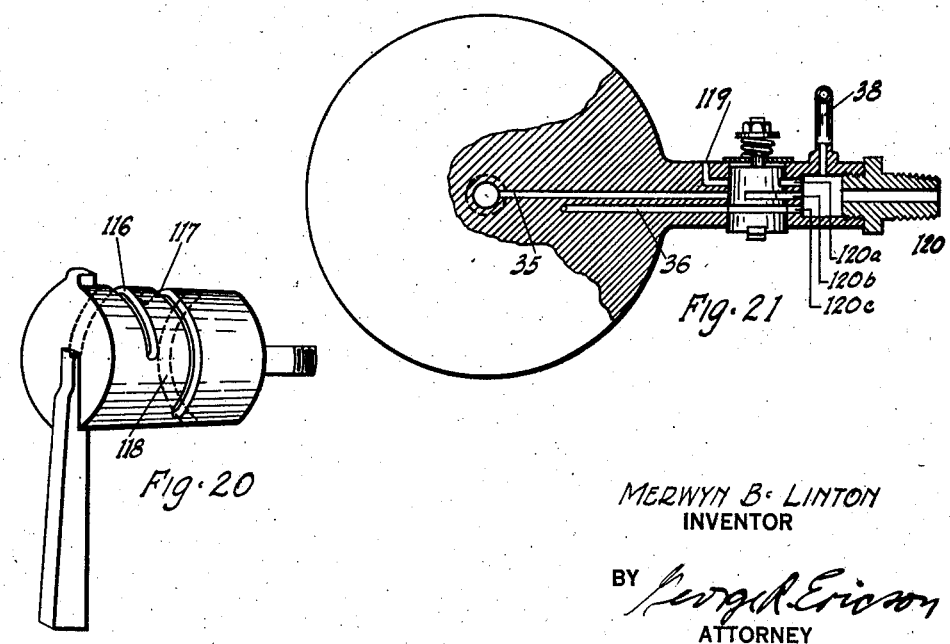

Figure 20 is an isometric view of this control valve.

Figure 21 is a plan view of the gun shown in Figures 14 to 16, with parts broken away to show the triple port control valve.

Figure 22 is another modification of yieldable base cartridge construction.

Referring to the drawings, the reference numeral 1 indicates a container which is mounted on a base 2 and removably attached thereto by means of the clamps 3. The base 2 is mounted on a platform 4 which is preferably provided with wheels 5 so that it may be easily moved from place to place; a handle or other means to pull it may be provided if desired. The platform or truck 4 comprises a pair of inwardly turned U-shaped side rails 6, which serve as a track for the rollers 7, upon which the base 2 is mounted. Two or more guard members 8 are fixed to the base 2 to prevent the base from becoming displaced with respect to the track 6.

The device is provided with elevating mechanism for the container which comprises a pair of hoisting members 9 which are pivoted to the platform, as indicated at 10, and to a bracket 11 on the container, as indicated at 12. In order to maintain the base and the container in vertical alignment as they are separated, a pair of side members 13 are pivoted to the hoisting members 9, as indicated at 14, and to the base, as indicated at 15. A parallelogram with the members 9 and 13 is formed by the addition of the members 16 and 17 which are pivoted together at 18 and to the other members as indicated.

It will be noted that the pivot 18 is vertically slidable in the vertical slot 19 formed in the bracket 11. The member 13 is provided with a pin 20 which is adapted to be engaged by a hook 21, which is pivotally mounted on the member 9, as indicated at 22. A lug 23 is carried by the hook 21 for engaging the member 9 to hold the hook in position to engage the pin 20.

The container is separable from the base, as indicated in Figure 3, and the separation or reattachment may be accomplished by operating the clamps or hasps 3, which are adapted to engage the lugs 24. When the clamps are released, the container may then be moved upwardly and to the right to the position shown in Figure 3. During this operation, the base 2 is maintained in a position directly under the container by the linkage 9, 13, etc., and when the container has been elevated, the hook 21 may be engaged with the pin 20, to hold the parts in that position while a new grease cartridge is being loaded on to the base. The grease is supplied in a cartridge 25 which is loaded on to the base, as indicated in Figures 3 and 8. It will be understood that paper, sheet metal, or any other material which may serve as an inexpensive shipping container for the grease or other lubricant may be used for making the cartridge.

The container is provided with a centrally disposed and vertically extending tube 26. This tube comprises a passage 27, which serves as a grease discharge outlet, and in applying the container to the base, the tube 26 is forced down through the center of the grease cartridge to a point substantially at its bottom. Slots 28 are provided at the lower end of the tube 26 to prevent the tube being sealed against the bottom of the grease cartridge. The container carries a plunger 29 having an expansible sealing member 30 in the form of a cup leather.

The walls of the container and the grease cartridge are slightly tapered for the purpose of permitting easy insertion and removal of the cartridge and the expansible plunger serves to follow the contour of the cartridge and maintain a grease tight fit. The plunger is operated by air under pressure, which is supplied through the inlet 31. The valve 32 is mounted on the container, as indicated, in order to control the flow of air in a manner hereinafter to be described.

The valve 32 is provided with two ports 33 and 34 and the container is provided with two separate passages 35 and 36, as indicated in Figure 9. The passage 35 communicates with the passage 27 in the tube 26, and the passage 36 communicates directly with the part of the container above the plunger, as indicated in Figure 8. Air vents 37 and 37A are provided for the valve ports 33 and 34, respectively, so that either of the passages 35 and 36 may be connected to the atmosphere when desired.

The booster pump comprises a cylinder 39 which is connected by means of an inlet check valve 40 with the passageway 27. An outlet check valve 41, normally held in closed position by spring 42 is provided to form a discharge outlet for the cylinder. The inlet check valve is provided with a guide 43 and is normally held in closed position by the spring 44. The whole assembly is insertable through an opening in the cylinder and held by a plug 45. A differential piston 46 provided with suitable packings 47 and 48 is mounted to reciprocate in cylinder 39 and in an operating cylinder 49. These cylinders are preferably, but not necessarily, formed integral with the container. A suitable head or cover 50 is detachably mounted on the cylinder 49 in fluid pressure tight relation thereto. The inner end of the cylinder 49 may be vented, if desired, at 51 and may also be provided with a lubricant receiving opening 52. Air or other operating fluid is supplied to the cylinder 49 under pressure through the conduit 37. A yoke 53 is mounted on the piston 46 and is adapted to straddle the valve rod 54, which is slidably mounted in a standard 55, and in a projection 56 forming part of the block of the cylinder 49. Suitable collars 57 and 58 are mounted on the valve rod to limit its movement in each direction. The valve rod 54 extends through the passageway 37 so that it may prevent the flow of operating fluid to the cylinder. It is also provided with a port 59, which, in the position shown in Figure 4, registers with the passage 37 so that fluid may be supplied therethrough to the cylinder 49. When the valve mechanism is moved to the left, from the position shown in Figure 4, a second port 60 in the valve rod 54 forms a connection between the passage 37 and the vent 61, so that when the valve rod is in this position, the pressure will be released from the cylinder 49.

In order to insure that the valve rod 54 will be maintained in one or the other of its operating positions, a snap action mechanism is provided. A yoke 62 is slidably mounted on the valve rod 54 in such a manner that its movement is limited only by two pins 63 and 64 fixed to the valve rod. A pair of springs 65, oppositely pivoted, are attached to the yoke as indicated at 67. A guide member 68 is mounted in the center of the spring and through the rotatable pivot 66, so that the members will be held in proper operating position. A pair of pins or stops 65A and 66A are mounted on the rod 54 to be engaged by the yoke 53 for initiating the reciprocating movement of the valve mechanism.

Figure 1:
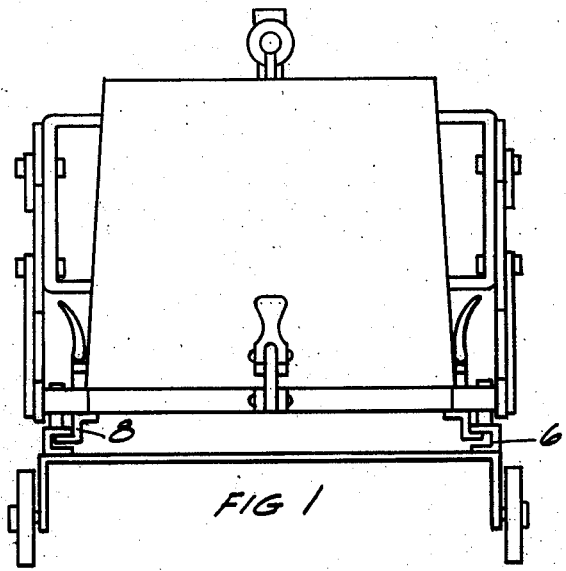
Figure 1 is an end elevation showing one modification of my invention.
Figure 2:
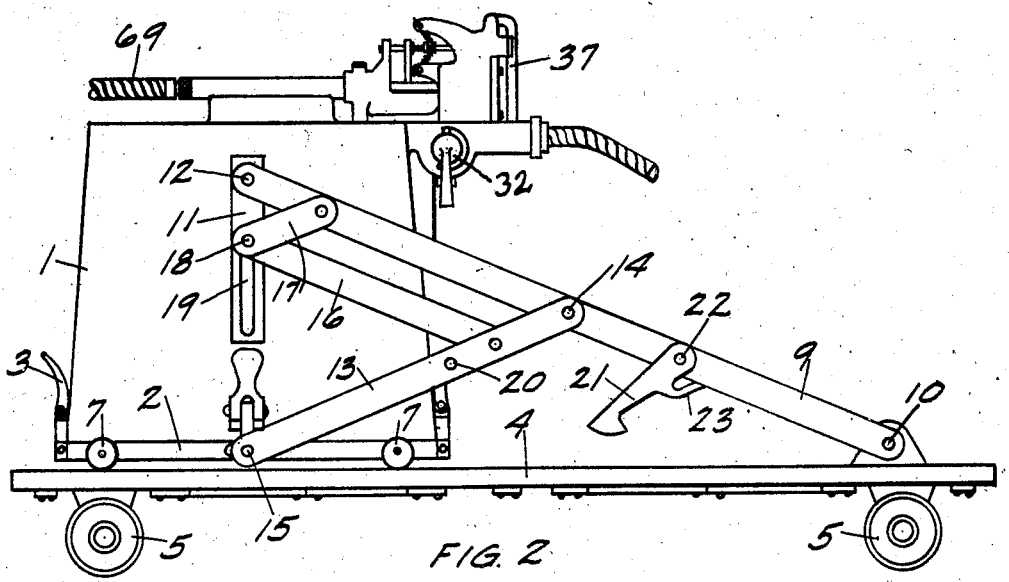
Figure 2 is a side elevation of the device shown in Figure 1.

The operation of the device is as follows:

A lubricant cartridge 25 being mounted on the base 2, the container is lowered and the clamps affixed, so that the parts are in the position shown in Figures 1, 2, and 8. When it is desired to supply lubricant under pressure through the discharge outlet 69, the valve 32 is moved to the position shown in Figure 11. Operating fluid may then flow through the port 33 into the container above the piston 29, and it will also flow to the booster pump through the conduit 37. The piston 29 is forced down on top of the lubricant, displacing it through the passageway 27 into the cylinder 39 of the booster pump.

If resistance is encountered in the discharge outlet, (which may be insured if desired by increasing the tension of the spring 42) and if the valve rod 54 is in a position to cut off admission of operating fluid to the cylinder 49, the pressure of the lubricant in the cylinder 39 will force the pistons 47 and 48 back to the position shown in Figure 4. This operation will cause the yoke 53 to contact with the yoke 62, moving it back past the center line between the pivots 66.

When this position has been reached, the spring 65 will continue to force the yoke 62 to the left, with reference to Figure 4, until the collar 57 contacts with the cylinder block. The port 59 will then register with the passage 37 to admit air into the cylinder 49, and the piston 48 will then be very forcibly moved to the left until the pin 63 has pushed the yoke 62 back past the enter line of the pivot 66. The valve action will then snap over to the left causing the admission of operating fluid to the cylinder 49 to be cut off, and the port 60 will then connect the passage with the cylinder 49, permitting the release of pressure on top of piston 29. It will then return the pistons 46 and 48 to the position shown in Figure 4, and this operation will be continuously repeated as long as the fluid pressure is supplied.

It will be understood, of course, that if there is no resistance in the discharge outlet 69, then no pressure will be built up in the cylinder 39 and the operation of the booster pump will be unnecessary. Under such conditions, there will be no pressure to move the pistons 46 and 48 to the right and the operation of the booster pump will be discontinued until there is some further back pressure in the discharge outlet.

When it is desired to insert a new cartridge, the valve 32 is turned to the position shown in Figure 12. The admission of compressed air to the passage 36 is then cut off and the passage 36 is connected to the atmosphere through the vent 37. The port 34 will then be in registration with the inlet 31 and also with passage 35, and operating fluid can flow into the passage 27 and downwardly through this passage to the lower part of the container. This operation will cause the piston 29 to be raised to the top of its stroke, as indicated in Figure 8. The valve 32 is now turned to the position shown in Figure 13, and the clamps 3 may then be released and swung out clear of the lugs 24 so that the container may be moved upwardly and to the right to the position shown in Figure 3. The linkage 9, 13, etc., moves the base 2 to the right at the same rate as the containers move to the right. The container and base are thereby kept in vertical alignment with each other. When the parts have reached the position shown in Figure 3, the hook 21 may be used to hold the parts in that position until the whole cartridge has been removed and the new one mounted on the base 2. When the new cartridge has been mounted on the base, the piston 29 may be permitted to drop and rest on top of the cartridge as the container is being moved downwardly into position. During this operation, the valve 32 may be left in the position shown in Figure 13, in which the supply of compressed air is entirely cut off, and in which the vents 37 and 38 are both open so that no air can be trapped in the device to prevent the proper assembly of the container with the base.

Referring to the construction shown in Figures 14 to 21, the reference numeral 70 indicates an annular projection cast integral with the lower part of the container 1. The upper surface of this projection being slightly bevelled, as indicated at 71, provides a seat for latches 72, the contour of the lower surface of this projection being formed so as to enable the operator to snap the upper part of the container into place on its base.

A plurality of latches 72 are provided, pivoted at 73, and held normally in the position shown in Figure 14 by coiled spring 74. Recesses 75 in the base casting allow sufficient movement of latches 72 to disengage projection 70. Reciprocating push rods 76 with cam surfaces 77 engage cam surfaces 78 on latches 72, and through links 79, pivots 80, ball joints 81, piston 82, cross arm 83, pivot 84, link 85, pivot 86, and foot lever 87 force latches 72 into the position shown in Figure 15. A latch 88 pivotally mounted on the foot lever 87 at 89 and held normally in an inward position by coil spring 90 forms a means of locking the latches in an open position, as shown in Figure 15.

A one way trip lug 91 pivotally mounted on the side of the container and held normally in the position shown by spring 92 forms a means of tripping latch 88 during a downward or closing motion of the upper part of the container 1. Spring 92 being substantially weaker than spring 90, it will be seen that trip lug 91 in its upward travel will yield and pass projecting surface 93 of latch 88 without tripping same. Springs 94 and 95 normally hold foot lever 87 in the position shown in Figure 14.

A piston 97 extending into the recessed base of the cartridge 98, as shown in Figure 14, and having a downward annular projection 99 which enters annular groove 100 in base casting 96 forms a means of locking latches 72 in the position shown in Figure 14 when pressure is applied within the cartridge, causing its recessed base to collapse by means of the corrugations 101 and piston 97 to move downward. It will be seen that the lower surface 102 of downward projection 99 contacts surface 103 of latches 72, thus locking them.

Piston rod 104 having an extension 105 in which slots 106 and 107 are cut form a guide for piston 97 and allow cross arm 83 and piston 97 to reciprocate, irrespective of each other, within the limits of said slots.

Base casting 96 may be a single casting or a plurality of castings suitably assembled.

A downwardly extending boss 108 threaded to receive cap 109 is provided to facilitate assembly.

A packing gland 110 and expanding ring 111 are provided to form an air tight seal of expanding chamber 112.

To lift piston 97 into the position shown in Figures 14 and 15, air or other fluid pressure is injected into expanding chamber 112 at port 113, which is supplied from valve 114 by flexible conduit 115.

In order to insure a positive locked position of the latches during a time when pressure is being exerted within the container, the pressure supplies 35 and 36 (Figure 21) to the inside of the gun and flexible conduit 115 supplying the expanding chamber 112 are controlled by a single valve 114.

Position 1 of the triple port valve 114 is shown in Figure 17. In this position, it will be seen that pressure will be exerted from supply 120C through port 116, passage 36, within the container above plunger 29, as shown in Figure 8. It will also be seen that in this position, port 117 is inoperative and port 118 is in such a position as to allow chamber 112 to exhaust to the atmosphere through passage 115, port 118, and vent 119.

It may be added that in this position the grease gun is closed with latches locked, and grease is being discharged through passage 27.

Position 2 of the control valve is shown in Figure 17. In this position, it will be seen that the space above plunger 29 is exhausting to the atmosphere through passage 36, port 116, and vent 37. It will also be noted that port 117 is in such a position as to allow pressure to flow from supply 120b through port 117, through passage 35, passage 27 to the lower part of the container below the plunger 29. Port 118 in this position is inoperative.

It is assumed that in this position the grease has been discharged from the container and the plunger 29 is forced upward into the position shown in Figure 8.

Position 3 of the control valve is shown in Figure 18. In this position, it will be seen that the spaces above and below plunger 29 are exhausting to the atmosphere through passages 27—25, port 117, and vent 37a, and through passages 36, port 116, and vent 37. It will also be noted that port 118 is in such a position as to allow pressure to flow from supply 120a through port 118, through passage 115, and port 113 into expanding chamber 112, causing piston 97 to rise, releasing latches 72 so that they may be manually unlatched by means of foot lever 87.

The operation of the device is as follows:

A grease cartridge 98 being mounted on base 96, the container is lowered. Trip lug 91 comes in contact with surface 93 of latch 88, disengaging lugs 121 and 122 and allowing manual mechanism to release and latches to return to position shown in Figure 14. During this time, the control valve will be in the position shown in Figure 19. The container is moved further downward and latches into position by reason of springs 74 of latches 72.

When it is desired to supply the lubricant under pressure, the control valve is moved to the position shown in Figure 17. Pressure then flows through port 116 and passage 36 in the container above the plunger 29, forcing grease through passage 27 to be picked up by the booster pump and discharged in the manner described heretofore in this specification.

As pressure is applied within the container, the recessed base of the cartridge collapses, and piston 97 moves downwardly, projection 99 engaging surfaces 103 of latches 72 and locking them in position.

When the grease has been discharged from the cartridge and it is desired to remove same, the control valve 114 is moved to the position shown in Figure 18. In this position, pressure is allowed to flow through port 117, passages 35 and 27 into the container below the plunger 29, causing same to be raised out of the cartridge. In this same position, pressure has been allowed to exhaust above the plunger 29 through vent 37.

The control valve is now moved to the position shown in Figure 19. In this position, pressure is allowed to flow through port 118, passage 115, and port 113 into chamber 112, causing piston 97 to rise and release latches 72. Pressure is now applied manually on foot pedal 123, opening the latches, lugs 121 and 122 becoming engaged and holding them open.

The control valve is now returned to the position shown in Figure 18, pressure being allowed to flow through passages 35 and 27 into the container, causing same to rise from its base, being held in line by the elevating mechanism heretofore described in this specification.

With reference to the construction shown in Figure 22, the reference numeral 98A indicates the outer wall of a grease cartridge. This wall is of circular cross section and may be formed of rigid material. A flange 98B is formed at the periphery of the lower end, and the metal is turned inwardly and upwardly, as indicated at 98C, to form recess 98D, in which the slidable bottom 98E is retained. The slidable or telescoping bottom is formed with a downwardly projecting flange 98F to fit into and form a lubricant tight seal with the recess 98D. In this manner, the necessity for the use of a flexible diaphragm is obviated.

I claim:

1. In a portable grease gun, a portable wheel platform, an open bottomed container, a base mounted on said platform and forming a bottom for said container, means for attaching said container to said base, means in said container for discharging the contents thereof, and a booster pump mounted on said container for increasing the pressure at which the contents of said container are discharged.

2. In a portable grease gun apparatus, a portable wheeled platform, a base mounted on said platform, an open bottomed container, means for clamping said container to said base whereby said base may form a bottom for said container, and hoisting mechanism carried by said platform for lifting said container from said base.

3. In a device of the class described, a portable platform, a base movably mounted upon said platform, an open bottomed container, means for releasably attaching said container to said base, hoisting mechanism carried by said platform for lifting said container away from said base and means for maintaining said container and said base in axial alignment with each other.

4. In a device of the class described, a portable platform, a base mounted on said platform, an open bottomed container adapted to be secured to said base, means carried by said container for discharging the contents thereof, hoisting means for moving said container away from said base, said hoisting means maintaining said container at all times in axial alignment with said base, and means for preventing the simultaneous operation of said hoisting means and said discharging means.

5. In a device of the class described, a base, a grease cartridge adapted to be mounted on said base, an open bottomed container adapted to be mounted on said base, and when so mounted to enclose said grease cartridge, hoisting means for lifting said container away from said base and said cartridge, said hoisting means being attached to both said container and said base, pressure means for discharging the grease from said cartridge, and a safety device for preventing the simultaneous operation of said pressure means and said hoisting means.

6. In a device of the class described, a platform, a base movably mounted on said platform, an upwardly tapering cartridge adapted to be mounted on said base, an open bottomed tapering container adapted to be fitted over and to conform to said cartridge and secured to said base, and means carried by said container for discharging the contents of said cartridge.

7. In a device of the class described, a portable platform, a base movably mounted on said platform, a cartridge adapted to be mounted on said base, a container adapted to be fitted over said cartridge and secured to said base, means carried by said container for discharging the contents of said cartridge and hoisting means carried by said platform for lifting said container away from said cartridge and said base.

8. A grease gun comprising a barrel, a cartridge for charging said barrel, a detachable closure for one end of said barrel, pressure means to discharge grease from said cartridge, latch means to prevent the detachment of said closure from said barrel, and means for preventing the operation of said latch means while said pressure means is in operation.

9. A lubricating gun comprising, a cylinder, a plunger therein, a tubular member communicating with the cylinder and permanently secured to and extending from the cylinder at an angle thereto, a removable lubricant cartridge secured to the cylinder having communication with the tubular member, and a piston forming a part of the gun assembly operable in the cartridge adapted to follow the lubricant as it is discharged into the cylinder.

10. A lubricating gun comprising, a cylinder having a plunger therein, a tubular member communicating with the cylinder and permanently secured to and extending at an angle from the cylinder, a piston guided by the extension, and a removable lubricant cartridge secured to the cylinder enclosing the member and piston.

11. In combination, a lubricant gun comprising, a pump cylinder, a piston mounted for reciprocation in said cylinder, a tubular member providing an inlet passageway for the cylinder permanently connected therewith and extending laterally therefrom, a low pressure piston slidable on said tubular member, and a lubricant cartridge detachably fixed to said gun about said tubular member with its inner wall in engagement with the low pressure piston.

12. A lubricating gun comprising, a lubricant cylinder having a plunger therein, a tubular member providing a cylinder inlet passageway for lubricant permanently fixed to and extending at an angle from the cylinder, and a piston mounted on and guided by said tubular member.

13. In a grease gun organization, the combination with a holder for a charge of grease, of a grease conducting tube co-operable with the holder for transferring a charge to the holder, a piston slidable on the tube, a grease container separable from the tube and co-operable therewith and with the piston so that when pressure is applied to a mass of grease in the container a portion thereof will be moved through the tube and conducted to the charge holder, means including said piston for exerting pressure upon grease in the container, and means for ejecting a charge from the holder.

14. A lubricating device comprising a cylinder, a plunger therein, a lubricant container detachably secured to said cylinder at an angle thereto, a tubular member secured to said cylinder at one end and projecting into said container and establishing communication between said cylinder and said container, a piston slidably and snugly fitting said container and mounted on said tubular member, and means for moving said piston toward the opposite end of said tubular member.

15. A lubricating device comprising a cylinder, a plunger therein, a lubricant container detachably secured to said cylinder at an angle thereto, a tubular member secured to said cylinder at one end and projecting into said container and establishing communication between said cylinder and said container, a piston slidably and snugly fitting said container and mounted on said tubular member, and means for exerting fluid pressure on the piston in said container on the side nearest the cylinder.

16. In a grease dispensing apparatus, a container having a discharge passage, a discharge port in said passage, a follower within the container and selective means comprising a single manually controlled valve member to admit air under pressure into the container to act on the follower and move the latter in one direction to force the grease through the discharge port when the control valve is opened or to admit air to the container to force the follower in an opposite direction.

17. In a grease dispensing apparatus, a container having a discharge passage and a discharge port in said passage, a follower within the container, means to supply air under pressure to the apparatus, and selective means to direct the air supply to either side of the follower or to exhaust the air from either or both sides of said follower, said selective means being constructed and arranged to cut off the air supply to each side of the container before the air is exhausted from that side.

18. In a grease dispensing apparatus, a container having a discharge passage and a discharge port in said passage, a manually operated spring closed valve for controlling the discharge port, a grease cartridge adapted to be positioned within the container, means to admit air under pressure to the container to force the grease through the discharge port, and selective means to control the admission of air to eject the grease, or to eject the empty cartridge from the container.

19. In a grease dispensing apparatus, a wheel supported platform, an open bottom container pivotally mounted above the platform, means to dispense grease from the container, a closure for the bottom of the container, and means to hold the container against pivotal movement.

20. In a grease dispensing apparatus, a wheel supported platform, an open bottom container pivotally supported by the standards above the platform, means to dispense the contents from the container, a closure for the bottom of the container, a locking bolt slidable in one of the standards, a keeper carried by the container for engagement by one and all of the locking bolts to hold the container against pivotal movement, and a spring actuated lever engaging the other end of the locking bolt to control the operation of said bolt.

21. In a lubricant gun, a body having a chamber with a side inlet opening, a plunger operable to force lubricant from the chamber, a cap integral with the body and surrounding the inlet opening, a tube connected with the body and communicating with the inlet opening and projecting in a direction parallel with the axis of the cap, a lubricant container having an open end detachably connected with the cap whereby the container projects therefrom parallel with the tube, and a piston slidable on the tube and fitting the inside of the container.

22. A lubricant gun including, a body having a high pressure chamber with a side inlet opening, a plunger operable to force lubricant from the chamber, a tubular member attached to the body to project therefrom and to communicate with the opening whereby there is a duct for passing lubricant to the chamber, a piston mounted on and guided by the tubular member, and a check valve controlling flow of lubricant in said duct allowing lubricant to enter the chamber from the duct.

23. In a grease gun, a holder for a charge of grease, a rigid tube secured to the holder to project laterally therefrom and to be in communication with the holder, a piston slidable on the tube, a grease container detachably secured to the holder to encase the tube and cooperate with the piston, and means whereby the piston is operated by fluid pressure in the container acting on one side of the piston.

24. A lubricating gun comprising, a cylinder, a plunger in said cylinder, a tubular member having one of its ends permanently secured relatively to and extending at an angle less than 180° from said cylinder, said member providing a duct for the supply of lubricant to said cylinder, a removable lubricant cartridge secured relatively to said cylinder and independently of said tubular member and having communication with said tubular member at the opposite end thereof, and a piston forming a part of the gun assembly, operable in said cartridge and adapted to follow the lubricant in said cartridge as it is discharged to said tubular member from said cartridge.

25. In combination, a lubricant gun comprising, a pump cylinder, a high pressure piston mounted for reciprocation in said cylinder, a tubular member providing a passageway for supplying lubricant to said cylinder, said member being permanently secured relative to said cylinder with a major portion of its axis extending at an angle less than 180° with respect to the axis of said cylinder, a low pressure piston slidable on said member, and a lubricant cartridge detachably fixed to said gun independently of said member with the inner wall of the cartridge in engagement with the low pressure piston.

26. A lubricating gun comprising, a lubricant cylinder, a plunger operative in said cylinder, a tubular member secured at one of its ends relative to said cylinder and providing a duct for the supply of lubricant to said cylinder, said member having the major portion of its length including its other end extending at an angle less than 180° with respect to the axis of said cylinder, and a piston slidably mounted on and guided by said member.

27. A lubricant gun including, a body having a chamber with a side opening, a plunger for forcing lubricant from the chamber, a tubular member permanently secured to and projecting from the body in communication with the opening, the outer end of the tubular member being open, a removable substantially cylindrical lubricant cartridge secured to the body to be in communication with the chamber and having its inner wall concentric to and substantially parallel with the tubular member, and a follower slidably carried on the tubular member and slidably fitting the inner wall of the cartridge.

28. A lubricating gun for use with a substantially cylindrical cartridge having an open end and a closed end, comprising a high pressure cylinder, a plunger therein, and a tubular member laterally connected to said cylinder, said tubular member being adapted to extend into the open end of the cartridge to a point adjacent to the closed end of the cartridge, and a circular follower of a diameter substantially corresponding to the internal diameter of the cartridge surrounding the tube and adapted to be placed over the lubricant in the open end of the cartridge.

29. A lubricating gun, for use with a substantially cylindrical cartridge, having an open end and a closed end, comprising a high pressure cylinder, a plunger therein, and a tubular member laterally connected to said cylinder, said tubular member being adapted to extend into the open end of the cartridge through the lubricant to a point adjacent to the closed end of the cartridge, a circular follower of a diameter substantially equal to the internal diameter of the cartridge surrounding the tube and adapted to be placed over the lubricant in the open end of the cartridge, and means for fastening said gun barrel to said cartridge, a check valve positioned in the tubular member, and a check valve positioned in the gun barrel.

30. A lubricating device comprising a pump body, pump mechanism in said body, said device including an elongated tubular part extending outwardly of the body and formed at its outer end with a lubricant inlet opening, a follower mounted on said part for movement longitudinally thereof, a cartridge having an open end to fit over said pump part with the follower slidably engaging the cartridge side wall, and means for detachably securing the cartridge to the pump body independently of said elongated tubular part.

31. A lubricating device comprising a pump body, pump mechanism in said body, said device including an elongated tubular part extending outwardly of the body and formed at its outer end with a lubricant inlet opening, a follower mounted on said part for movement longitudinally thereof, a cartridge having an open end to fit over said pump part with the follower slidably engaging the cartridge wall, means for detachably securing the cartridge to the pump body independently of said elongated tubular part, a fluid operated motor for operating said pump mechanism and connections for supplying fluid to said motor and to said cartridge on the side of the follower adjacent the pump body.

32. A lubricating device comprising a pump body formed with a fluid motor cylinder, a piston reciprocable in said cylinder, a plunger connected to and operable by said piston, an elongated tubular member extending outwardly from said pump body and formed at its outer end with a lubricant inlet opening, an open ended lubricant container secured to said body around and concentric with said tubular member, a follower slidably mounted on said member and engageable with the container whereby movement of the follower outwardly of the member will force lubricant from the container into said lubricant inlet opening.

33. A lubricating device comprising a pump body formed with a fluid motor cylinder, a piston reciprocable in said cylinder, a plunger connected to and operable by said piston, an elongated tubular member extending outwardly from said pump body and formed at its outer end with a lubricant inlet opening, an open ended lubricant container secured to said body around and concentric with said tubular member, a follower slidably mounted on said member and engageable with the container whereby movement of the follower outwardly of the member will force lubricant from the container into said lubricant inlet opening and connections to supply fluid to said motor cylinder and to the container on the side of the follower adjacent the pump body.

34. A lubricating device comprising a central body portion, a pump mechanism carried thereby, an elongated hollow member carried by said body portion and having an open end forming an inlet for said pump mechanism, a lubricant container having an open end and a closed end, means for detachably securing the open end to said container to said body portion about said hollow member, and means for moving lubricant in said container to said closed end, said hollow member extending through the container to a point proximate said closed end for receiving lubricant therefrom.

35. A lubricating device comprising a central body portion, a fluid pressure operated pump mechanism therein, a control for said mechanism, an elongated hollow member carried by said body portion and having an open end forming an inlet for said pump mechanism, an open end lubricant container having a closed end, means for detachably securing said container relative to said body portion in a position encompassing said hollow member, said hollow member extending through the container to a point proximate said closed end, a follower slidably carried by said hollow member for engaging the surface of the lubricant in said container, and means for applying fluid under pressure against the side of the follower remote from the lubricant to force lubricant to said closed end and for supplying fluid under pressure to said control.

MERWYN B. LINTON.